United States Patent
Brown et al.

(10) Patent No.: US 11,965,775 B2
(45) Date of Patent: Apr. 23, 2024

(54) METHOD AND APPARATUS FOR FOCUS CORRECTION OF MULTI-IMAGE LASER BEAM QUALITY MEASUREMENTS

(71) Applicant: OPHIR-SPIRICON, LLC, Irvine, CA (US)

(72) Inventors: Fon Ray Brown, Hyrum, UT (US); Jeff Brown, North Andover, MA (US); Jed Simmons, Mendon, UT (US)

(73) Assignee: OPHIR OPTRONICS SOLUTIONS, LTD., Jerusalem (IL)

( * ) Notice: Subject to any disclaimer, the term of this patent is extended or adjusted under 35 U.S.C. 154(b) by 533 days.

(21) Appl. No.: 17/058,465

(22) PCT Filed: Jul. 8, 2019

(86) PCT No.: PCT/US2019/040891
§ 371 (c)(1),
(2) Date: Nov. 24, 2020

(87) PCT Pub. No.: WO2020/018308
PCT Pub. Date: Jan. 23, 2020

(65) Prior Publication Data
US 2021/0199495 A1    Jul. 1, 2021

Related U.S. Application Data

(60) Provisional application No. 62/701,244, filed on Jul. 20, 2018.

(51) Int. Cl.
*G01J 1/02* (2006.01)
*G01J 1/42* (2006.01)

(52) U.S. Cl.
CPC .......... *G01J 1/0214* (2013.01); *G01J 1/4257* (2013.01)

(58) Field of Classification Search
CPC ...... G01J 1/0214; G01J 1/0414; G01J 1/4228; G01J 1/4257
See application file for complete search history.

(56) References Cited

U.S. PATENT DOCUMENTS

| 8,988,673 B2 | 3/2015 | Guttman et al. |
| 2005/0121596 A1 | 6/2005 | Kam et al. |

(Continued)

FOREIGN PATENT DOCUMENTS

| CN | 1249810 A | 4/2000 |
| CN | 101351734 A | 1/2009 |

(Continued)

OTHER PUBLICATIONS

Jorge, Kelly C. et al. "Scattered light imaging method (SLIM) for characterization of arbitrary laser beam intensity profiles". Applied Optics, vol. 53, No. 20, Jul. 10, 2014, pp. 4555-4564. (Year: 2014).*

(Continued)

*Primary Examiner* — Michael A Lyons
(74) *Attorney, Agent, or Firm* — Edward Scott Trask

(57) ABSTRACT

The present application discloses a method and apparatus for compensation of focal errors in laser beam measurement instruments that characterize beam parameters by analyzing images of Rayleigh scatter taken at multiple angles around the beam axis. If the laser beam is not precisely positioned, these images may not be in focus, and the instrument will not report accurate results. This method and apparatus finds the longitudinal axis of the beam by analyzing the beam location in at least two images. All images are subdivided into slices and distances from the beam axis to the focal plane for each slice are calculated and used to find an out-of-focus transfer function for each slice, which is used in combination with the modulation transfer function of the system to deconvolve the slice. Images formed by reassembling the deconvolved (Continued)

slices can then be analyzed to obtain the correct beam parameters.

6 Claims, 14 Drawing Sheets

(56) References Cited

U.S. PATENT DOCUMENTS

| | | | |
|---|---|---|---|
| 2006/0258942 | A1 | 11/2006 | Van Beek et al. |
| 2013/0016358 | A1 | 1/2013 | Guttman et al. |
| 2014/0233022 | A1 | 8/2014 | Scaggs |
| 2016/0341969 | A1 | 11/2016 | Manger |
| 2018/0029164 | A1 | 2/2018 | Kramer et al. |
| 2022/0244161 | A1* | 8/2022 | Misawa .................. G01N 21/85 |

FOREIGN PATENT DOCUMENTS

| | | |
|---|---|---|
| CN | 104136882 A | 11/2014 |
| CN | 106473702 A | 3/2017 |
| CN | 114008418 A | 2/2022 |
| IL | 156856 A | 2/2004 |
| JP | 1987095742 A | 5/1987 |
| JP | 2003014583 A | 1/2003 |
| JP | 2013522651 A | 6/2013 |
| WO | 1990012999 A1 | 11/1990 |
| WO | 2011119721 A2 | 9/2011 |

OTHER PUBLICATIONS

Van der Horst, Jelle et al. "Image resolution and deconvolution in optical tomography". Optics Express, vol. 24, No. 21, Oct. 17, 2016, pp. 24460-24472. (Year: 2016).*

The International Search Report issued to PCT/US2019/040891 dated Oct. 30, 2019, 5 pages.

The Written Opinion issued to PCT/US2019/040891 dated Oct. 30, 2019, 3 pages.

The Office Action issued for JP counterpart application No. 2021-503009 dated Jul. 4, 2023 (6 pages).

Kelly C. Jorge et al., Scattered light imaging method (SLIM) for characterization of arbitrary laser beam intensity profiles, Applied Optics, Jul. 9, 2014, vol. 53, No. 20, p. 4555, DOI: 10.1364/AO.53.004555.

Jelle Van Der Horst et al., Image resolution and deconvolution in optical tomography, Optics Express, Oct. 12, 2016, vol. 24, No. 21, pp. 24460, DOI: 10.1364/OE.24.024460.

Maohai, Hu. Study on laser confocal scanning microscopic imaging system and its information analysis, (2004).

Huaixin, Chen et al. "Quasi-focusing properties of ripple-modulated laser beams" Intense laser and particle beam, vol. 13 No. 6 (2001) pp. 10-14.

Office Action issued for CN counterpart application No. 201980043526.9 issued Dec. 29, 2023 (11 pages).

* cited by examiner

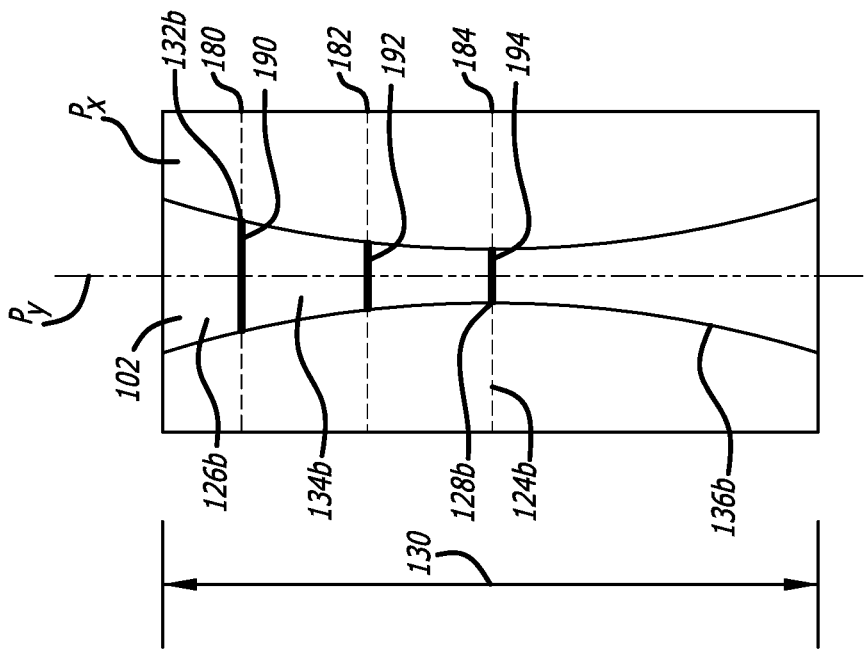
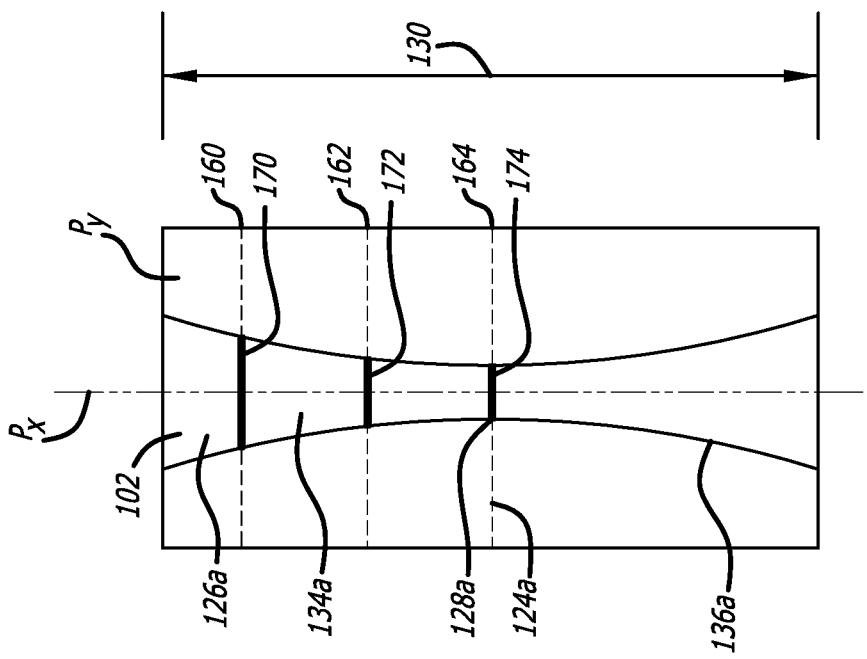

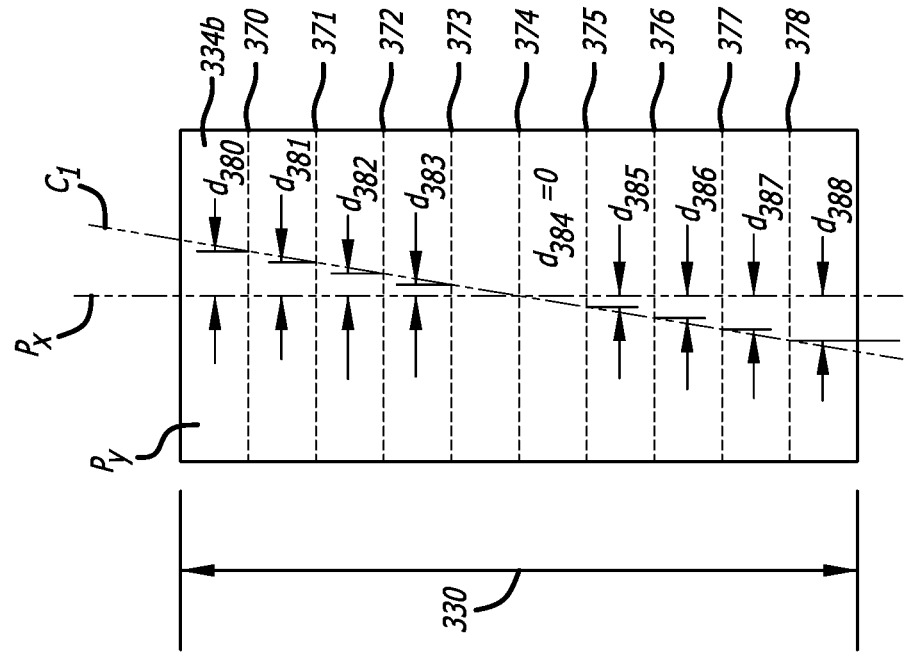
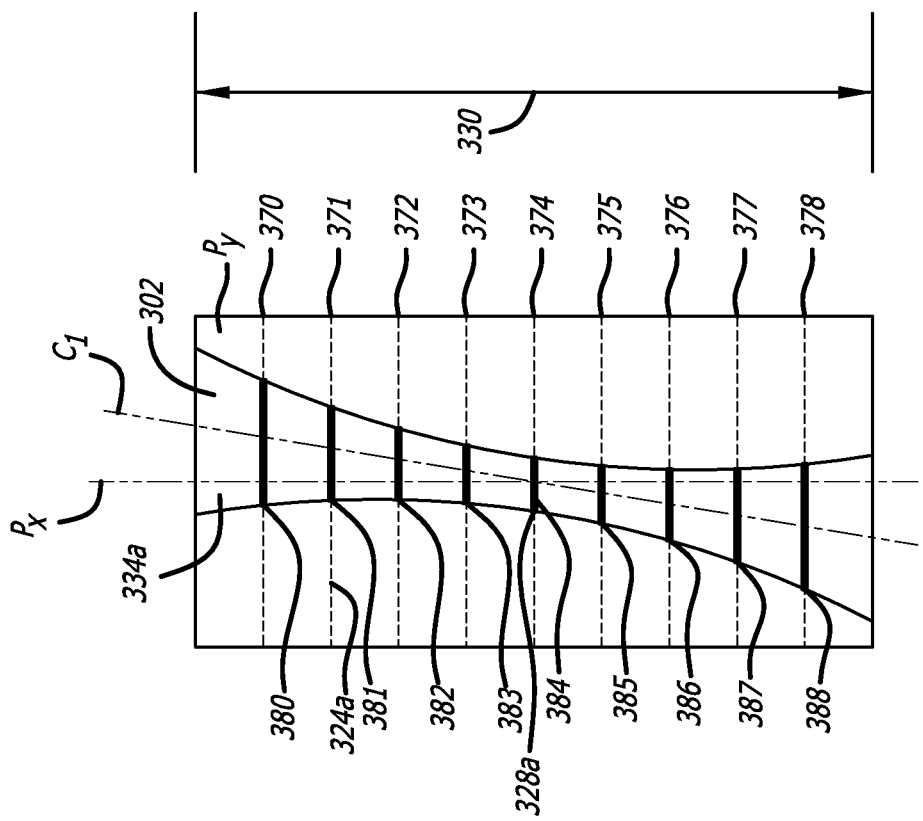
FIG. 8A
FIG. 8B

METHOD AND APPARATUS FOR FOCUS CORRECTION OF MULTI-IMAGE LASER BEAM QUALITY MEASUREMENTS

CROSS-REFERENCE TO RELATED APPLICATIONS

The present application claims priority to U.S. Provisional Patent application Ser. No. 62/701,244—entitled "Method and Apparatus for Focus Correction of Multi-Image Laser Beam Quality Measurements," filed on Jul. 20, 2018, the contents of which are incorporated by reference in their entirety herein.

BACKGROUND

High power lasers are being used increasingly in materials processing applications. Understanding the performance parameters of the laser beam provides important insight into process control and process improvements. Laser beam profilers are used for this purpose. One technique used to measure the quality of a focused laser beam is to acquire multiple images of the Rayleigh scatter of the beam, then process those images digitally to compute parameters such as beam waist size, beam centroid, angular divergence and $M^2$ beam propagation ratio and the like. A laser beam profiler apparatus that measures Rayleigh scattering is described in U.S. Pat. No. 8,988,673 issued Mar. 24, 2015 and assigned to Ophir-Spiricon, LLC, the contents of which are incorporated herein by reference.

While prior art laser beam profilers have proven useful in the past, some shortcomings have been identified. For instance, the laser beam being measured may not completely overlap the focal planes of the imaging devices of the laser beam profiler. This may produce focal errors that can lead to erroneous beam characterization results. As such, there is an ongoing need for a method and apparatus that detects and compensates for the focal errors.

SUMMARY

The present application discloses a method of focus correction of at least one image of a laser beam measurement system in order to accurately compute a wide variety of beam parameters. Exemplary beam parameters include beam waist size and location, beam centroid, Rayleigh range, angular divergence, beam parameter product, and $M^2$ beam propagation ratio. While the description included herewith discusses methods of correcting for focus errors, those skilled in the art will appreciate that a variety of methods may be used to measure and correct for various characteristics of laser beam measurements. Additionally, the focus correction methods described herein may be used with a variety of light beams.

In one embodiment, the present application discloses a method of correcting for an in-focus image by the steps of determining at least one location of at least one focal plane having at least one in-focus modulation transfer function $H(\xi)$, determining at least one out-of-focus transfer function $G(\xi,d)$ for at least one out-of-focus image, capturing at least one image with at least one imaging device, using the image(s) to determine the central axis for at least one light beam, dividing the image(s) into multiple one-dimensional slices, calculating at least one distance from the focal plane to a point on said central axis corresponding to each slice, using the distance data for each slice to resolve the out-of-focus transfer function for each slice, and deconvolving each slice of the image against $H(\xi)G(\xi,d)$. Optionally, at least one corrected image of the laser beam may be displayed.

In addition, the present application discloses an apparatus used for focus correction of at least one image of a laser beam measurement system in order to accurately compute a wide variety of beam parameters. The present application discloses an apparatus having at least one imaging device defining at least one focal plane and configured with at least one in-focus modulation transfer function $H(\xi)$, with the imaging device further configured to capture at least one image of at least one scattered light signal, at least one image processing device configured to determine at least one axis of the light signal and to divide the image into multiple slices, each slice corresponding to a point on the axis, and calculate at least one distance, d, from said point(s) to the corresponding focal plane, and use the distance, d, to resolve at least one out-of focus transfer function $G(\xi,d)$ for each slice and deconvolve each slice of image against $H(\xi)G(\xi, d)$. Optionally, at least one corrected image of the laser beam may be displayed.

Other features and benefits of the embodiments of a method and apparatus for focus correction for multi-image laser beam quality measurements as disclosed will become apparent from a consideration of the following detailed description.

BRIEF DESCRIPTION OF THE DRAWINGS

Various embodiments of a method and apparatus for focus correction for multi-image laser beam quality measurements will be explained in more detail by way of the accompanying drawings, wherein:

FIGS. 3A and 3B show images of the beam caustics of the laser beam as captured by the laser beam quality measurement apparatus relative to the focal planes shown in FIG. 2 for use with a focus correction method;

FIGS. 8A and 8B show images of the beam caustic shown in FIG. 7A showing slices sampled along the beam image relative to focal plane $P_y$ for use with an embodiment of the focus correction method;

DETAILED DESCRIPTION

Figure 1:
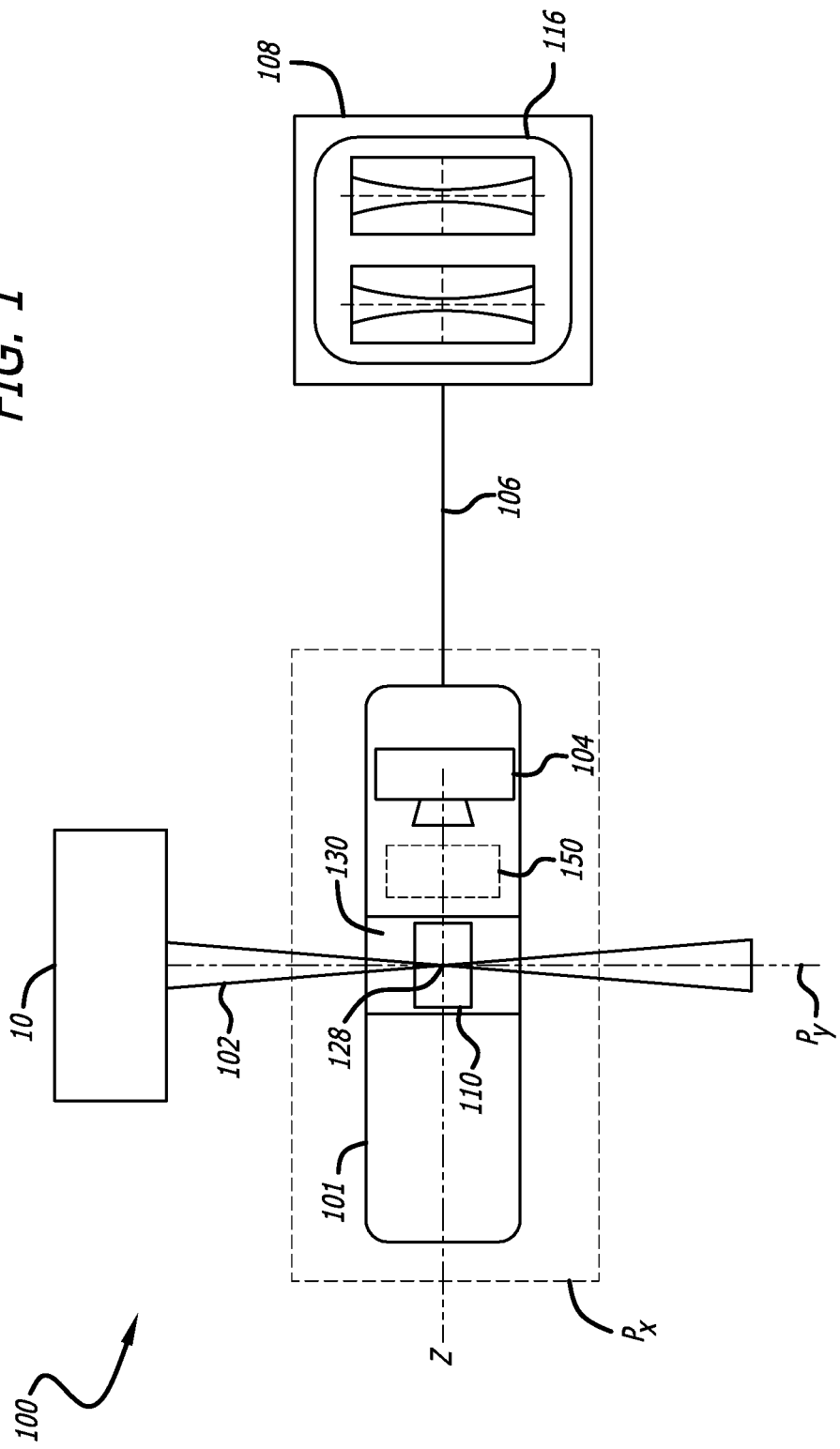
FIG. 1 shows an embodiment of a laser beam quality measurement apparatus for use with a focus correction method.

Generally, optical systems that are out of focus have a distinct two-dimensional point spread function or transfer function. For small point spread functions where the image changes slowly in one dimension, these functions can be approximated by a set of simpler one-dimensional line spread functions or modulation transfer functions. In the embodiments described below, the two-dimensional point spread function is approximated by simpler one-dimensional line spread functions that may be applied to one slice of an image at a time.

In the embodiments described below, the modulation transfer function for out-of-focus images may be characterized a priori, either mathematically or empirically. This modulation transfer function is denoted $G(\xi,d)$ where $\xi$ represents the spatial frequency and d represents the distance of the object from the focal plane. In the illustrated embodiment, the laser beam quality measurement apparatus may comprise an imaging device and optical system that have a modulation transfer function denoted $H(\xi)$ that may also be characterized a priori by a variety of methods.

In the embodiments described below, images of the beams are deconstructed slice by slice. An approximation of each slice of the image captured by the imaging devices described above may be $y(x)=b(x)*g(x,d)*h(x)$ where x is the pixel location in each slice, $y(x)$ is one slice of the camera image, $b(x)$ is the profile of the beam for that slice, and $g(x,d)$ and $h(x)$ are the spatial domain equivalents of $G(\xi,d)$ and $H(\xi)$ respectively, where the asterisk denotes convolution. To find an estimate of $b(x)$, the distance of the beam from the focal plane for a given slice of the image needs to be determined. That distance, d, can be used to find the composite line spread function by convolving $g(x,d)$ with $h(x)$. When this is done, the resulting function may be used to deconvolve $y(x)$, the given slice of camera image. For digital cameras, $y(x)$ will be discrete, yielding accurate results if $y(x)$ is effectively band limited to spatial frequencies below the Nyquist frequency as described below. In practice, $b(x)$, $g(x,d)$ and $h(x)$ are considered to be discrete as well. An alternate expression of the transfer function needed for deconvolution may be $G(\xi,d)H(\xi)$, which is the Fourier transform of $g(x,d)*h(x)$. This allows the earlier equation to be written equivalently as $Y(\xi)=B(\xi)G(\xi,d)H(\xi)$. In another alternate method, at least one noise term $n(x)$ may be added such that the approximation of each slice may be $y(x)=b(x)*g(x,d)*h(x)+n(x)$ or $Y(\xi)=B(\xi)G(\xi,d)H(\xi)+N(\xi)$.

Alternatively, the deconvolution can be implemented in two dimensions, which is an approach widely used with focal correction. The two-dimensional point spread function (or impulse responses) $h(x,y)$ and $g(x,y,d)$ may be computed once their one-dimensional modulation transfer functions are known, and they may be used for the two-dimensional deconvolution. Generally, the computing requirements for this approach are significant, and for the purpose of imaging laser beams that do not change rapidly slice to slice, a one-dimensional deconvolution may suffice. Those skilled in the art will appreciate that a number of alternative methods for processing image data may be employed to correct for beam focus errors.

Simply put, the method for focus correction of laser beam quality measurements involves 1) capturing images of the beam and from them determining the axis of the beam in three dimensions, 2) dividing each image into multiple slices, 3) finding the distance from the beam axis to the focal plane for each slice of each image, 4) Deconvolving each slice using the transfer function corresponding to that distance, and 5) reassembling the deconvolved slices into an image that can be used to compute beam parameters.

FIG. 1 shows an embodiment of a laser beam quality measurement apparatus 100. As shown, the apparatus may comprise at least one housing 101 with one or more imaging device 104 positioned therein and in optical communication with at least one sampling region 130. One or more optical systems 150 may be in optical communication with the sampling region 130 and the imaging device 104. Alternatively, the laser beam measurement apparatus 100 need not include an optical system 150. Further, any number of additional imaging or measurement devices and/or sensors may be used with the laser beam quality measurement apparatus 100. As shown, at least one laser or light source 10 may direct at least one beam 102 into and/or through the sampling region 130. Those skilled in the art will appreciate that the light source 10 may comprise light emitting diodes, superluminescent diodes, flashlight beams and the like. The imaging device 104 and optical system 150 may be configured to capture one or more light signals from the laser beam 102 and direct them via at least one conduit 106 to at least one image processing module 108. In one embodiment, the imaging device 104 and optical system 150 may be configured to capture one or more light signals that are Rayleigh scattered from the beam 102, although those skilled in the art will appreciate that Raman scattering or any variety of scattering effects or other optical phenomena may be observed by the laser beam quality measurement system.

Referring again to FIG. 1, the image processing module 108 may be configured to process at least one scattered light signal and display one or more images on one or more displays 116. As shown, the beam 102 may have one or more focal points or beam waists 128 as it propagates through the sampling region 130. In the illustrated embodiment, the beam waist or focal point 128 may be defined as the location or region where the beam is most tightly focused or where the cross section of the beam is the smallest or where the beam power or optica l fluence is most highly concentrated. In many material processing applications, the user may locate the beam waist on the surface of or within the material to be processed, though thoe skilled in the art will appreciate that that the beam waist may be positioned at a variety of positions relative to the material to be processed. In one embodiment, the housing 101, the optical system 150 and the imaging device 104 may define one or more focal planes. In the illustrated embodiment, the housing 101, the optical system 150 and the imaging devices 104 define two focal planes, $P_y$ and $P_x$, and at least one plane Z, although those skilled in the art will appreciate that any number of housings or imaging devices may be used that define any number of planes or focal planes. In the illustrated embodiment, plane Z is substantially orthogonal to the image planes $P_y$ and $P_x$, though in another embodiment plane Z may not be orthogonal to the image planes $P_y$ and $P_x$. Optionally, the operator may use at least one alignment device 110 to align the beam 102 within the sampling region 130 such that the beam 102 substantially intersects both focal planes, $P_x$ and $P_y$, although those skilled in the art will appreciate that the use of such an alignment device is not required.

Figure 2:
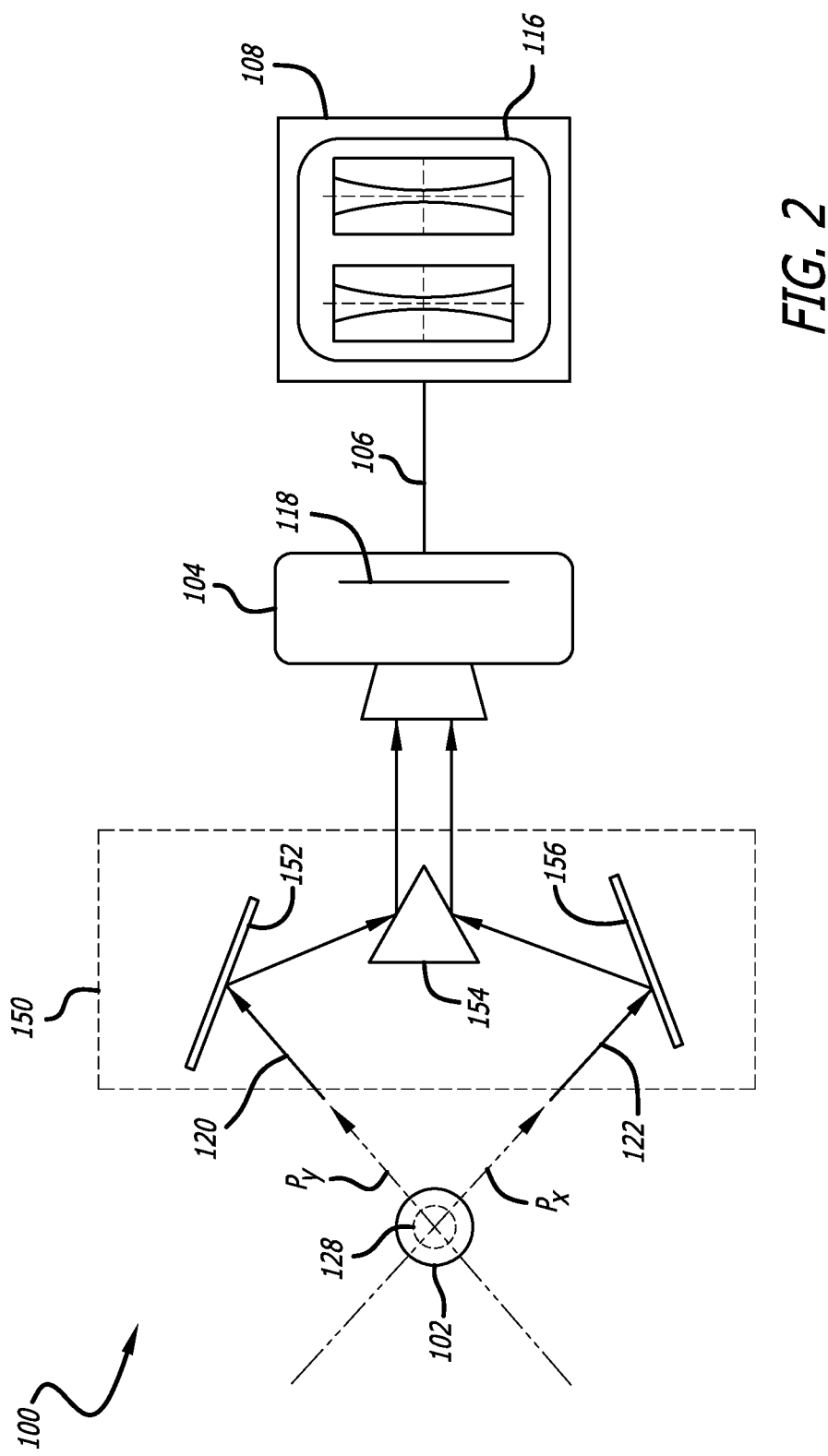
FIG. 2 shows a view of the embodiment of a laser beam quality measurement apparatus for use with a focus correction method shown in FIG. 1 where the laser beam intersects at least two focal planes.

FIGS. 2 and 3A-3B show various views of the embodiment of the laser beam quality measurement apparatus 100 shown in FIG. 1, as looking through plane Z. As shown, one or more light signals 120 and 122 from the beam 102 may be directed to the imaging device 104 via the optical system 150. In the illustrated embodiment the light signals 120 and 122 are Rayleigh-scattered from the beam 102. Those skilled in the art will appreciate that any number of light signals scattered in a variety of ways may be measured. In the illustrated embodiment, the optical system 150 and the imaging device 104 define focal planes $P_y$ and $P_x$ oriented orthogonal to each other, although those skilled in the art will appreciate that focal planes $P_y$ and $P_x$ may not be orthogonal to each other. Optionally, the optical system 150 and the imaging device 104 may define a single focal plane or more than two focal planes that may intersect at a variety of angles. In short, any number of focal planes may be defined by the optical system 150 and/or the imaging device 104. As shown in FIG. 2, the beam 102 is shown end-on, intersecting the focal planes $P_y$ and $P_x$, as though it were entering or exiting the plane Z as the surface of the page. The optical system 150 may comprise at least one reflecting surface 152 and at least one optical element 154, although those skilled in the art will appreciate that any variety of optical elements and components may be used in the optical system 150. In the illustrated embodiment, the optical system 150 comprises two reflecting surfaces 152 and 156. In the illustrated embodiment, reflecting surfaces 152 and 156 are planar mirrors. Optionally, the reflecting surfaces 152, 156 may be a dielectric mirrors, replicated mirrors, concave mirrors, convex mirrors, and the like. Also, the reflecting surfaces 152, 156 could be a grating, such as echelle gratings, holographic gratings, volume holographic gratings, volume Bragg gratings, and the like. In the illustrated embodiment, the optical element 154 is a prism. Optionally, the optical element 154 may be a beamsplitter, mirror, or other reflective or refractive optic. Those skilled in the art will appreciate that the optical system 150 may comprise any combination of reflecting surfaces, refractive optics, lenses, collimators, filters, spatial filters, irises, stops, and the like. As shown, the scattered light signals 120 and 122 are reflected by the reflecting surfaces 152 and 156 respectively and are directed by the optical element 154 to the imaging device 104. The imaging device 104 may comprise at least one image sensor 118 located therein. In the illustrated embodiment, the imaging device 104 is a camera with at least one CMOS image sensor 118 located therein. Optionally, the image sensor 118 may be a charge-coupled device (CCD) image sensor, focal plane array, pyroelectric array, scanning array, time-delay integration imager and the like. Those skilled in the art will appreciate that a wide variety of image sensors, imaging devices or imaging systems may be used with the apparatus 100. Also, those skilled in the art will appreciate that rather than using a single imaging device, multiple imaging devices may be used, or the imaging device 104 may be repositionable during use. Also, the scattered light signals 120 and 122 may be collected by an alternative optical system such as a fiber bundle, an elliptical reflector, or a parabolic reflector that may direct the scattered light signals 120, 122 to the imaging device 104. FIGS. 10-13 described below show various views of alternate embodiments using multiple imaging devices as described herein, wherein similar reference numbers refer to similar components. In the alternative, FIG. 14 shows an embodiment where a single imaging device is used and the imaging device is repositionable from a first position $T_1$ to a second position $T_2$, thereby allowing multiple images to be acquired at multiple angles, each image with its own focal plane.

As shown in FIG. 2, the imaging device 104 may be connected to at least one image processing module 108 via at least one conduit 106. Exemplary types of conduits 106 include, without limitation, electrical cables (such as USB, FireWire, CAT5), fiber optic cables or digital optical cables. Optionally, the conduit 106 may comprise network or wireless communication protocols such as GigE Ethernet, Bluetooth, WiFi and the like. The image processing module 108 may comprise at least one display 116. Exemplary types of displays 116 include, without limitation, computer graphics or graphical user interfaces that are displayed on flat-screen, LED or LCD monitors and the like.

FIGS. 3A and 3B show images 134a and 134b relating to the focal planes $P_y$ and $P_x$ respectively as shown on the display 116. Optionally, the display 116 may show a single image or any number of images 134. As shown in FIG. 2, in the illustrated embodiment, the beam 102 propagates along the intersection of focal planes $P_y$ and $P_x$. FIG. 3A shows at least one image 134a of at least one beam caustic 126a relating to focal plane $P_y$ captured by the imaging device 104 as the beam 102 is aligned so that it propagates through the sampling region 130. The image processing module 108 may generate one or more slices of the image 134a by scanning the image 134a with one or more cursors 124a. For example, slices 170, 172 and 174 may be captured at one or more cursor positions 160, 162 and 164 respectively. Those skilled in the art will appreciate that any number of slices may be generated by the image processing module 108. The image 134a may exhibit at least one beam waist 128a that is shown approximately in the center of the sampling region 130. Alternatively, the beam waist 128a may be anywhere in the image 134a.

FIG. 3B of the illustrated embodiment shows at least one image 134b of at least one beam caustic 126b relating to focal plane $P_x$ captured by the imaging device 104 as the beam propagates through the sampling region 130. In the illustrated embodiment, the image processing module 108 may generate one or more slices 190, 192 and 194 of the beam image 134a by scanning the image 134a with at least one cursor 124a at one or more cursor positions 180, 182 and 184 respectively. In the illustrated embodiment, the images 134a and 134b shown in FIGS. 3A and 3B are substantially identical, exhibiting one or more edges 136a and 136b that may be observed to be in focus, so no focus correction is required. The image processing module 108 may use the images 134a, 134b and/or slices 170-174 and 190-194 from FIGS. 3A and 3B to compute a set of beam parameters such as beam waist size, location or focal shift, Rayleigh range, beam centroid, angular divergence, beam parameter product and the $M^2$ beam propagation ratio, and the like, that the operator may use to characterize and control performance of the laser or light source 10 shown in FIG. 1. Those skilled in the art will appreciate that any number of beam parameters or characteristics of the beam 102 may be computed.

Figure 4:
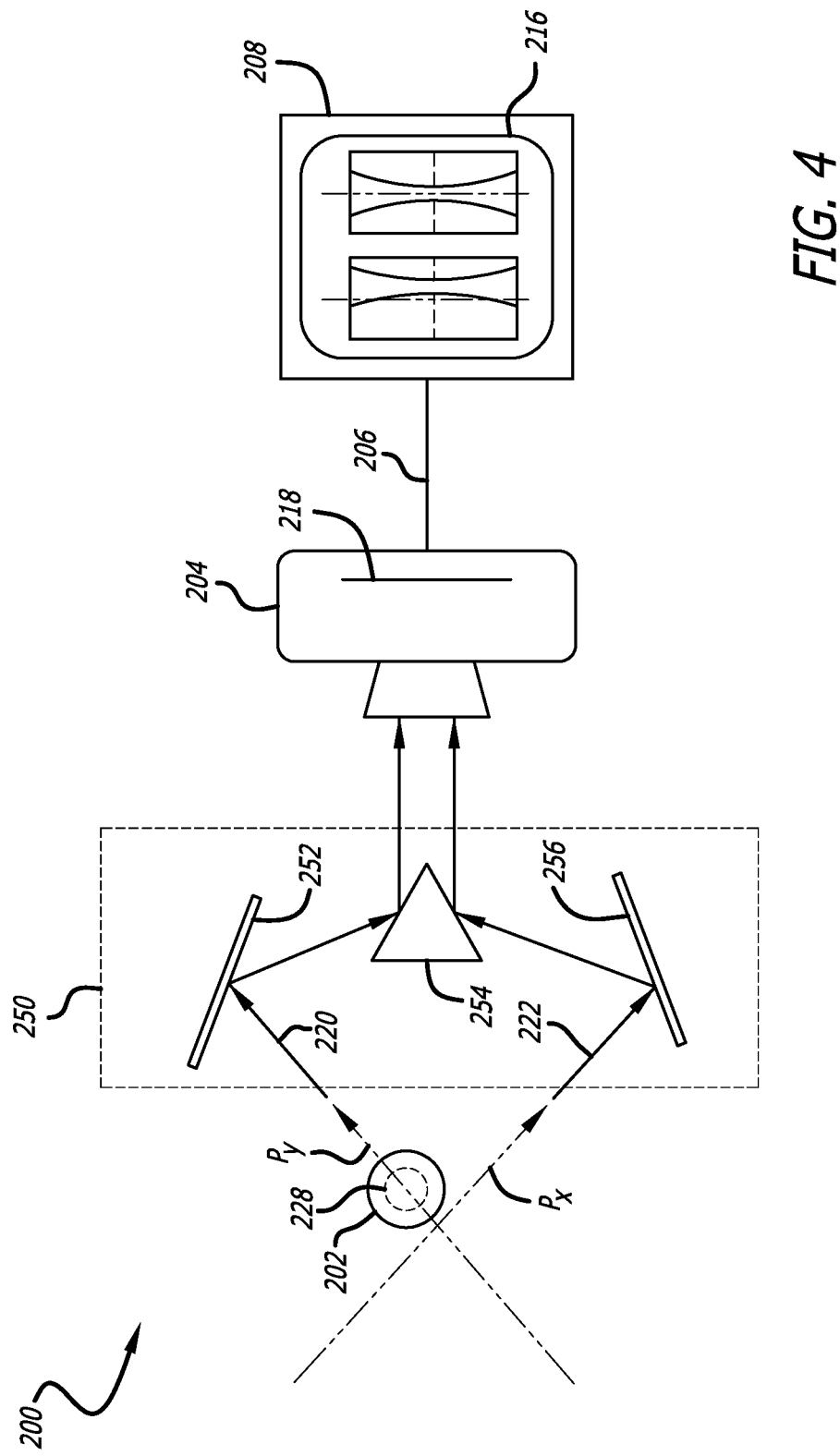
FIG. 4 shows an alternate view of the embodiment of a laser beam quality measurement apparatus shown in FIG. 1 where the laser beam intersects only one focal plane.

FIG. 4 shows an alternate view 200 of the embodiment of a beam quality measurement apparatus shown in FIGS. 1 and 2 where at least one beam 202 may traverse at least one sampling region 230 and may be positioned so that it intersects focal plane $P_y$, but not focal plane $P_x$. In the illustrated embodiment, the beam 202 includes one or more beam waists 228, though those skilled in the art will appreciate that the beam 202 need not include a beam waist 228. If the beam 202 is offset from or is not parallel to one or both focal planes, the beam 202 may be observed as being out of focus over some or all of its extent. As shown, one or more scattered light signals 220 and 222 may be directed by at least one optical system 250 to one or more image sensors 218 positioned in at least one imaging device 204. As described above, many types of image sensors 218 may be used in the imaging device 204. In the illustrated embodiment, the optical system 250 includes at least one reflecting surface 252 and at least one optical element 254, although those skilled in the art will appreciate that any variety of optical elements and components may be used in the optical system 250. In the illustrated embodiment, the optical system 250 comprises two reflecting surfaces 252 and 256. Alternative components for use in the optical system 250 are described above with respect to optical system 150.

Figure 5B:
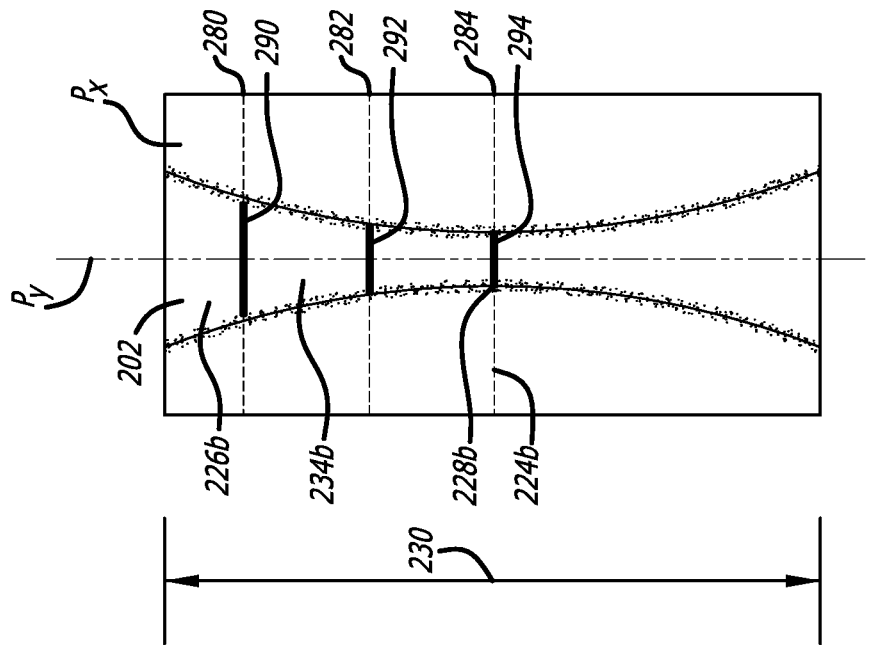
FIGS. 5A and 5B show images of the beam caustics of the laser beam as captured by the laser beam quality measurement apparatus relative to the focal planes shown in FIG. 4 for use with a focus correction method.
Figure 5A:
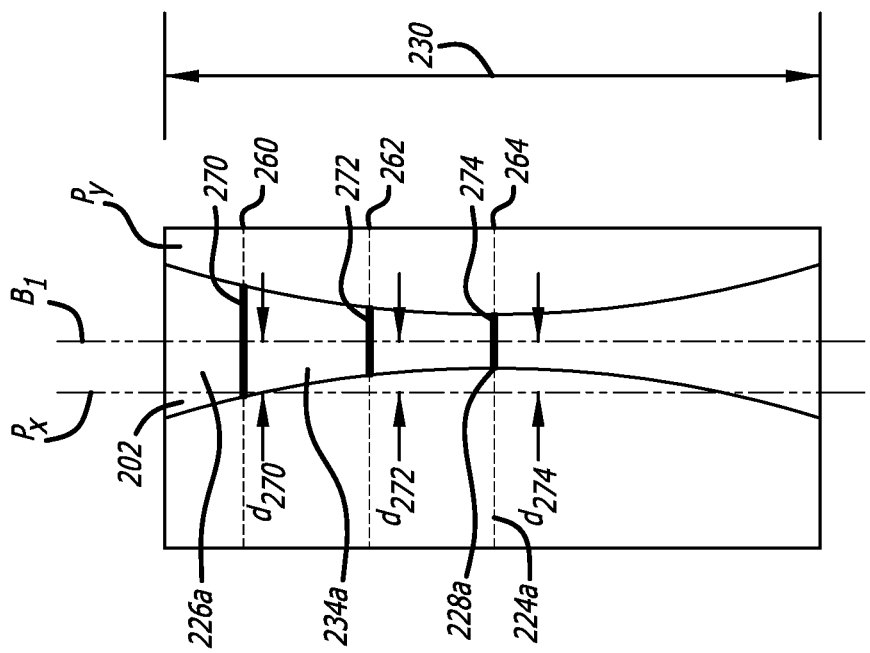

FIGS. 5A and 5B show images 234a and 234b as captured by the imaging device 204, directed by at least one conduit 206 to the image processing module 208 and processed by the image processing module 208 and shown on the display 216. As shown in FIGS. 4 and 5A, the beam 202 may intersect the focal plane $P_y$, and the image 234a may be observed to be in focus. FIG. 5A shows at least one image 234a of at least one beam caustic 226a of the beam 202 relating to focal plane $P_y$ captured by the imaging device 204 as the beam 202 propagates through the sampling region 230. In the illustrated embodiment, for example, the image processing module 208 may generate one or more slices 270, 272 and 274 by scanning the image 234a with at least one cursor 224a at cursor positions 260, 262 and 264 respectively. Those skilled in the art will appreciate that any number of slices may be generated by the image processing module 208. In the illustrated embodiment, the image processing module 208 may be configured to analyze the image to determine at least one axis $B_1$ and to use that data to compute the distance d from a point on $B_1$ corresponding to each slice to the focal plane $P_x$, whose position is known. For example, once the axis $B_1$ is defined, the distance d from the center of slice 270 to the focal plane $P_y$ is computed and denoted $d_{270}$. The image processing module 208 then uses the location of axis $B_1$ at each slice, assigning the values of the distances $d_{270}$, $d_{272}$ and $d_{274}$ from each respective slice. As described below, this distance data is used to deconvolve each slice using the transfer function corresponding to that distance, and reassemble the deconvolved slices into an image that can be used to compute the correct beam parameters of the beam 202.

Referring to FIG. 4 and FIG. 5B of the illustrated embodiment, the display 216 of the image processing module 208 shows at least one image 234b of the beam caustic 226a of the beam 202 relating to focal plane $P_x$, captured by the imaging device 204 as the beam 202 propagates through the sampling region 230. As shown in FIG. 5B, the image processing module 208 may generate slices 290, 292 and 294 of the beam image 234b with at least one cursor 224b at cursor positions 280, 282 and 284 respectively. In the illustrated embodiment, because the beam 202 is offset from focal plane $P_x$, the image 234b and slices 290, 292 and 294 may be observed as being out of focus, causing the image 234b to appear blurry. Also, the image of the beam waist 228b captured in slice 294 at cursor position 284 may appear smaller or larger than it should be. The blurry appearance of the image 234b may cause the laser beam quality measurement system to yield incorrect beam parameter results. However, the image processing module 208 may be configured to correct for the blur of the image 234b by using the distances $d_{270}$, $d_{272}$, $d_{274}$, etc. calculated from the image 234a to determine at least one out-of-focus transfer function $G(\xi,d)$ for each slice, which is used in combination with the known modulation transfer function $H(\xi)$ of the system to deconvolve each slice. The images formed by reassembling the deconvolved slices can then be analyzed to compute the correct beam parameters described above. Those skilled in the art will appreciate that any combination of beam measurements or processing algorithms may be used to correct the focus errors caused by the axis of the beam 202 not being coincident with the focal planes of the apparatus 200.

Figure 6:
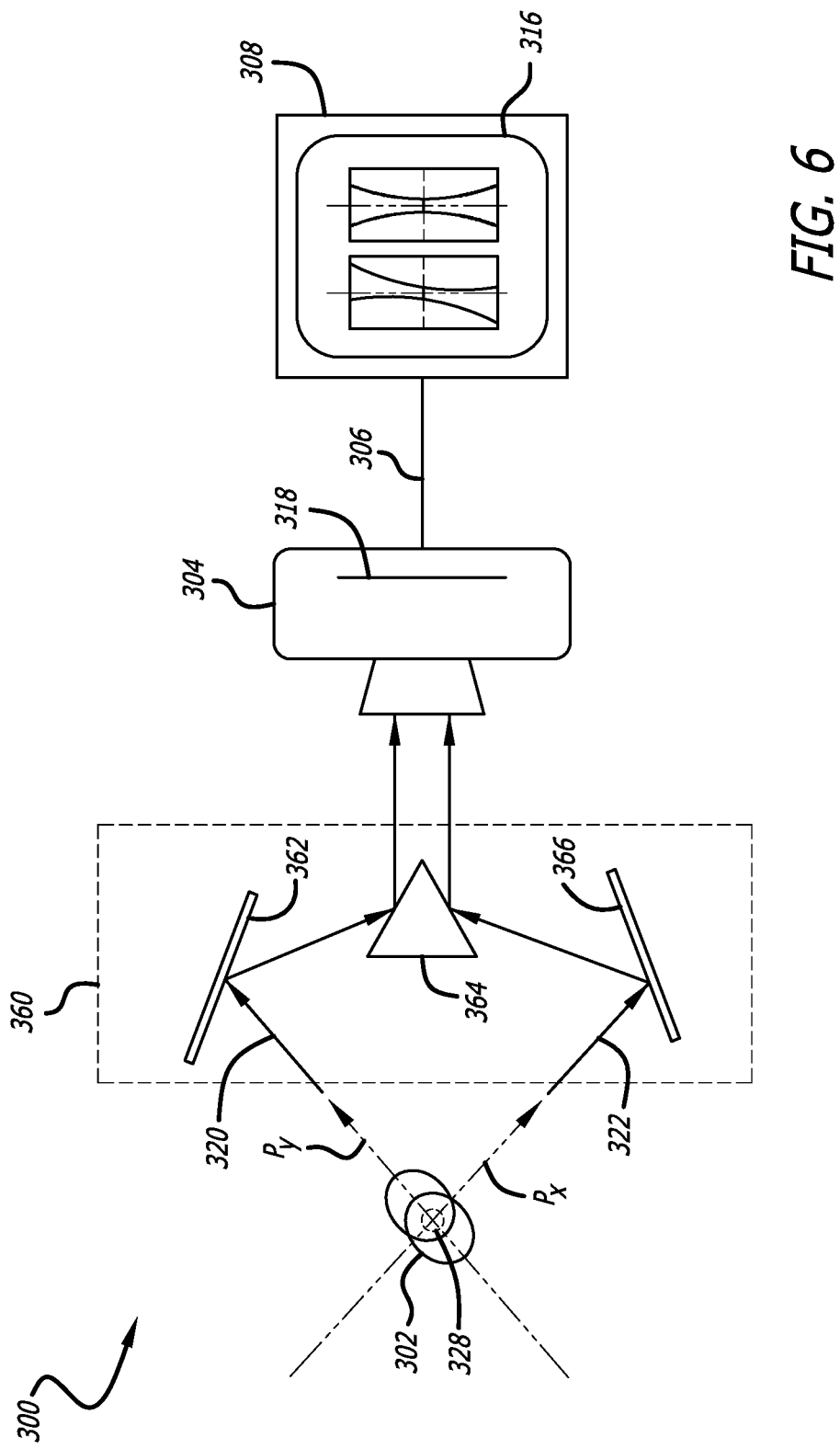
FIG. 6 shows an alternate view of the embodiment of a laser beam quality measurement apparatus shown in FIG. 1 where the laser beam intersects two focal planes at an angle.
Figure 7B:
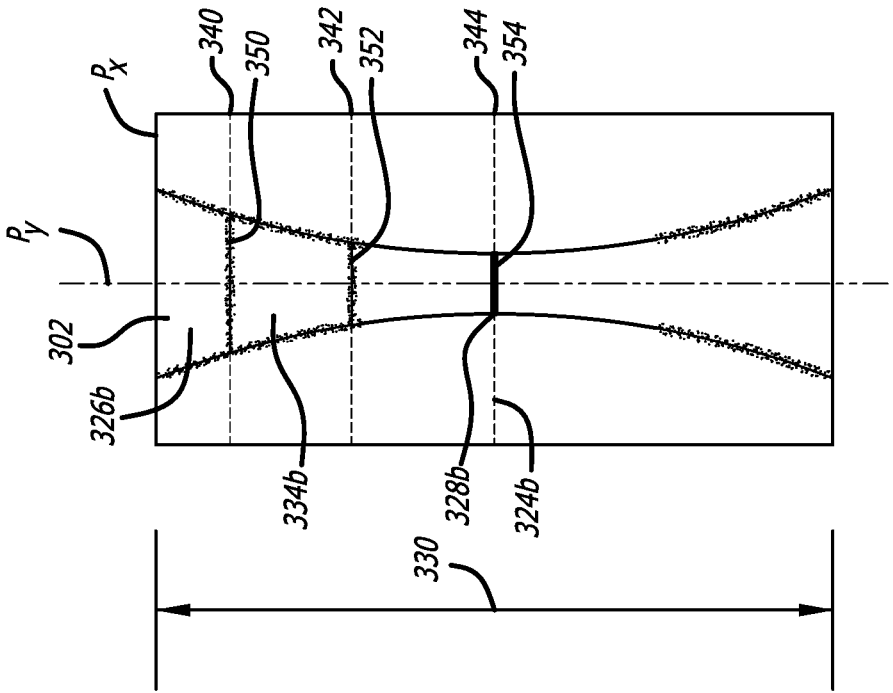
FIGS. 7A and 7B show images of the beam caustics of the laser beam as captured by the beam quality measurement apparatus relative to the focal planes shown in FIG. 6.
Figure 7A:
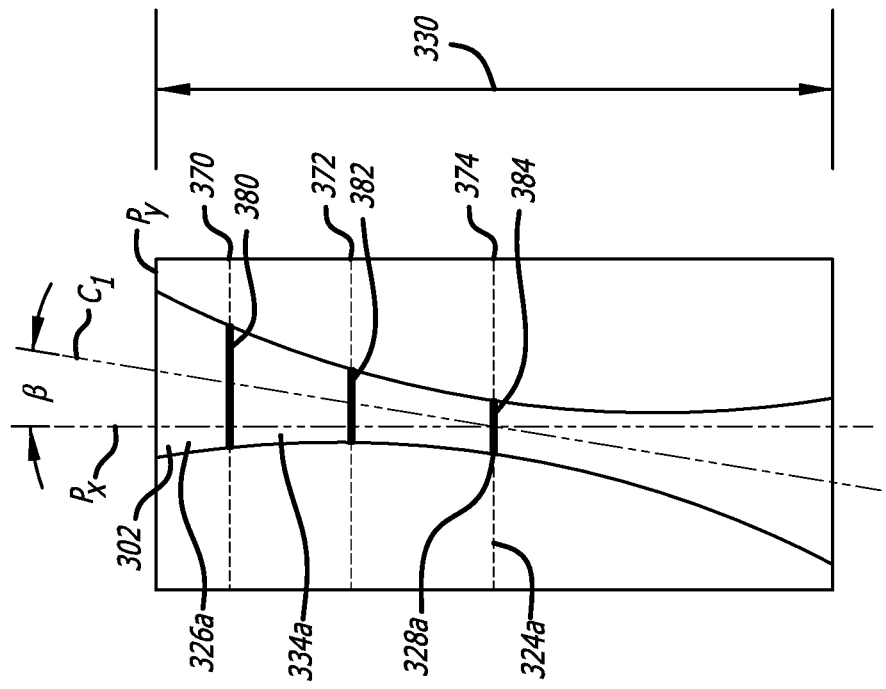
Figure 9C:
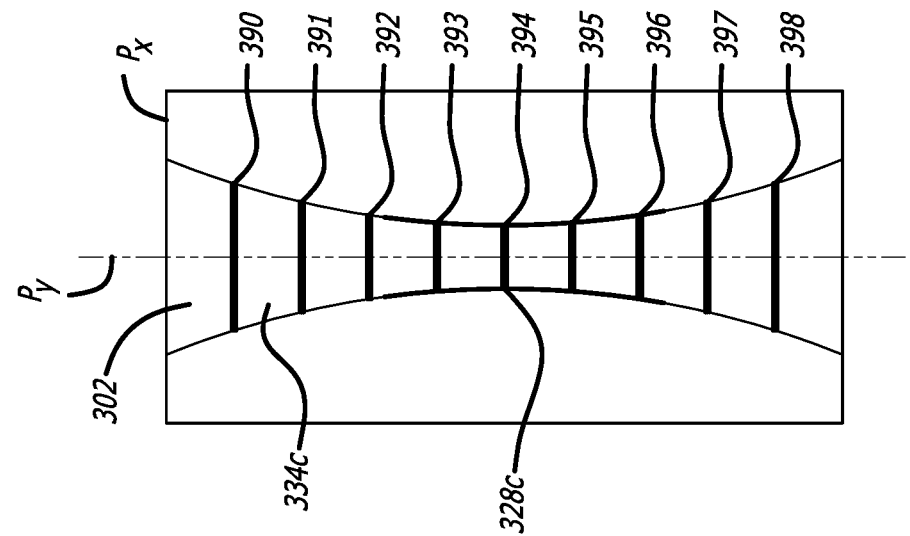
FIGS. 9A-9C show images of the beam caustic shown in FIG. 7B showing slices sampled along the beam image relative to focal plane $P_x$, and the resulting correction with an embodiment of the focus correction method.
Figure 9B:
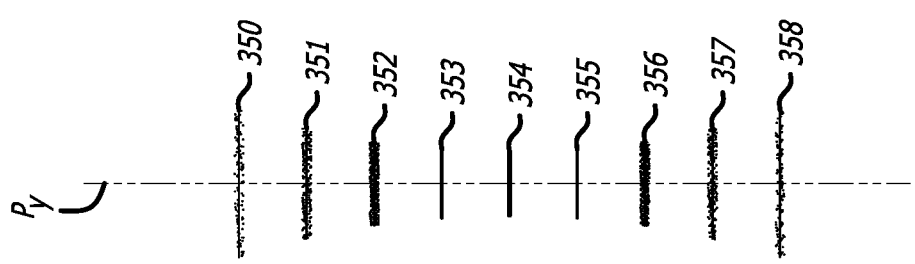
Figure 9A:
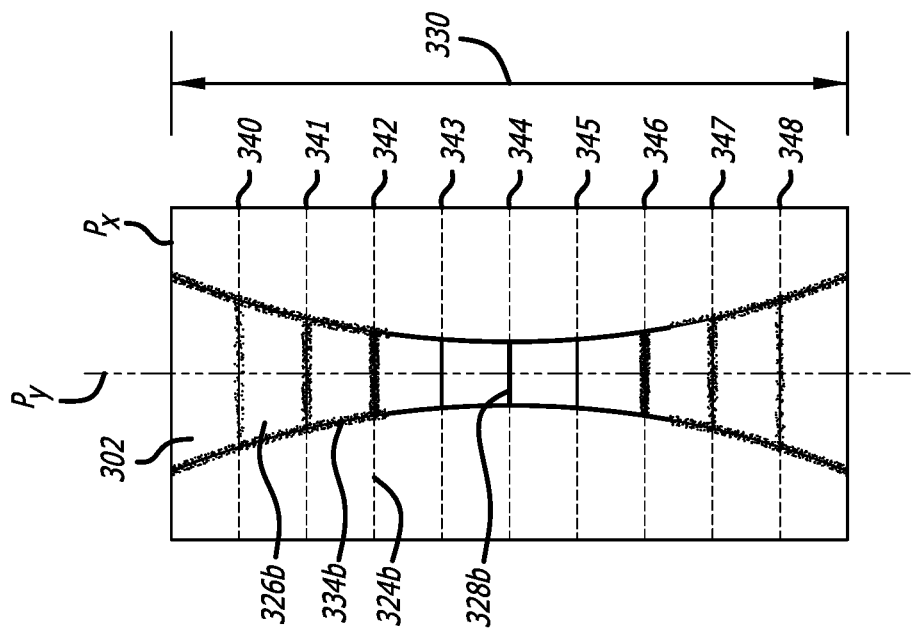

FIGS. 6 and 7A-7B show various images of alternate view 300 of the embodiment of a beam quality measurement apparatus shown in FIGS. 1 and 2 where at least one beam 302 traverses at least one sampling region 330 and is positioned such that it intersects but may not be parallel to at least one of focal planes $P_y$ and $P_x$. In the illustrated embodiment, the beam 302 may include one or more beam waists 328, though those skilled in the art will appreciate that the beam 302 need not have a beam waist 328. As shown in FIG. 6, one or more scattered light signals 320 and 322 scattered from the beam 302 may be directed by at least one optical system 360 to one or more image sensors 318 positioned in at least one imaging device 304. As described above, many types of image sensors 318 may be used in the imaging device 304. In the illustrated embodiment, the optical system 360 includes at least one reflecting surface 362 and at least one optical element 364, although those skilled in the art will appreciate that any variety of optical elements and components may be used in the optical system 360. In the illustrated embodiment, the optical system 360 comprises two reflecting surfaces 362 and 366. Alternative components for use in the optical system 360 are described above with respect to optical system 150. FIG. 7A shows at least one image 334a of at least one beam caustic 326a of the beam 302 relating to focal plane $P_y$, as captured by the image sensor 318 of the imaging device 304 (shown in FIG. 6) as the beam 302 propagates through the sampling region 330 and is directed by at least one conduit 306 to at least one image processing module 308. In the illustrated embodiment, the image processing module 308 may generate slices 380, 382 and 384 by scanning the image 334a with at least one cursor 324a at cursor positions 370, 372 and 374 respectively. In the illustrated embodiment, the image processing module 308 may analyze the image to define an axis $C_1$ that is shown as slanted at angle β relative to the focal plane $P_x$, but the image 334a otherwise may be observed to be in focus. FIG. 7B shows an image 334b of at least one beam caustic 326b of the beam 302 relating to focal plane $P_x$, captured by the imaging device 304 and processed by the image processing module 308. The image processing module 308 may generate slices 350, 352, 354 by scanning the image 334b with at least one cursor 324b at locations 340, 342 and 344 respectively. In the illustrated embodiment, because the beam 302 may intersect focal plane $P_x$ only at the beam waist 328b, only the beam waist 328b may be observed to be in focus, and the remainder of the image 334b may be observed to be out of focus. Those skilled in the art will appreciate that the beam 302 may intersect focal planes $P_y$ and $P_x$ at a variety of angles, or the beam 302 may intersect neither focal plane $P_y$ and $P_x$ FIGS. 8A and 8B show various views of image 334a of the beam 302 as shown on the display 316. In the illustrated embodiment, FIG. 8A shows the image 334a as shown in FIG. 7A, with slices 380-388 generated by the image processing module 308 by scanning the image 334a with cursor 324a at cursor positions 370-378. Those skilled in the art will appreciate that many more slices may be created and analyzed by the image processing module 308 to provide increased resolution. As shown in FIGS. 8A and 8B, the image processing module 308 analyzes the image 334a to define the optical axis $C_1$. Optionally, the image processing module 308 may analyze multiple images to define any number of optical axes. For example, in the illustrated embodiment, once the optical axis $C_1$ is defined, distances $d_{380}$ through $d_{388}$ from the optical axis $C_1$ to the image plane $P_x$ (whose position is known) may be calculated for each slice 380-388 by the image processing module 308. As described below, this data may then be used to remove the out-of-focus blur of the image 334b shown in FIGS. 7B and 9A. Those skilled in the art will appreciate that the out of focus blur may be corrected by applying a variety of optical or signal processing methods to the images the beam 302.

FIGS. 7A-7B, 8A-8B and 9A-9C show the progression of image 334b shown in FIG. 7B from being out of focus to being in focus, as displayed on the display 316. FIG. 7B shows an image 334b of the beam caustic 326b as captured by the imaging device 304 and processed by the image processing module 308. The image processing module 308 may generate slices 350-358 by scanning the image 334b with at least one cursor 324b at locations 340-348. Those skilled in the art will appreciate that the processing module 308 may capture any number of slices at any number of positions along the sampling region 330. Because the beam 302 is not parallel to the focal plane $P_x$, one or more of the slices 350-358 may appear out of focus. In this embodiment, because the beam waist 328b at cursor position 344 intersects the focal plane, the beam waist 328b may be observed to be in focus, though those skilled in the art will appreciate that the beam waist 328b may not be in focus, and a different location of the beam may be in focus instead. In contrast to the slice 354 at the beam waist, for example, slices 355-358 and 353-350 may become progressively more out-of-focus the further they are from the beam waist position 344. The distances $d_{380}$ through $d_{388}$ from the center of slices 380-388 to the optical axis $C_1$ as shown in FIGS. 8A and 8B as described above are used to deconvolve each slice 380-388 using the in-focus transfer function $H(\xi)$ and the out-of-focus transfer function $G(\xi,d)$ corresponding to that distance, and reassemble the deconvolved slices into an image 334c shown in FIG. 9C with slices 390-398 that can be used to compute the correct beam parameters such as beam divergence and beam propagation ratio $M^2$ as described above.

Figure 10:
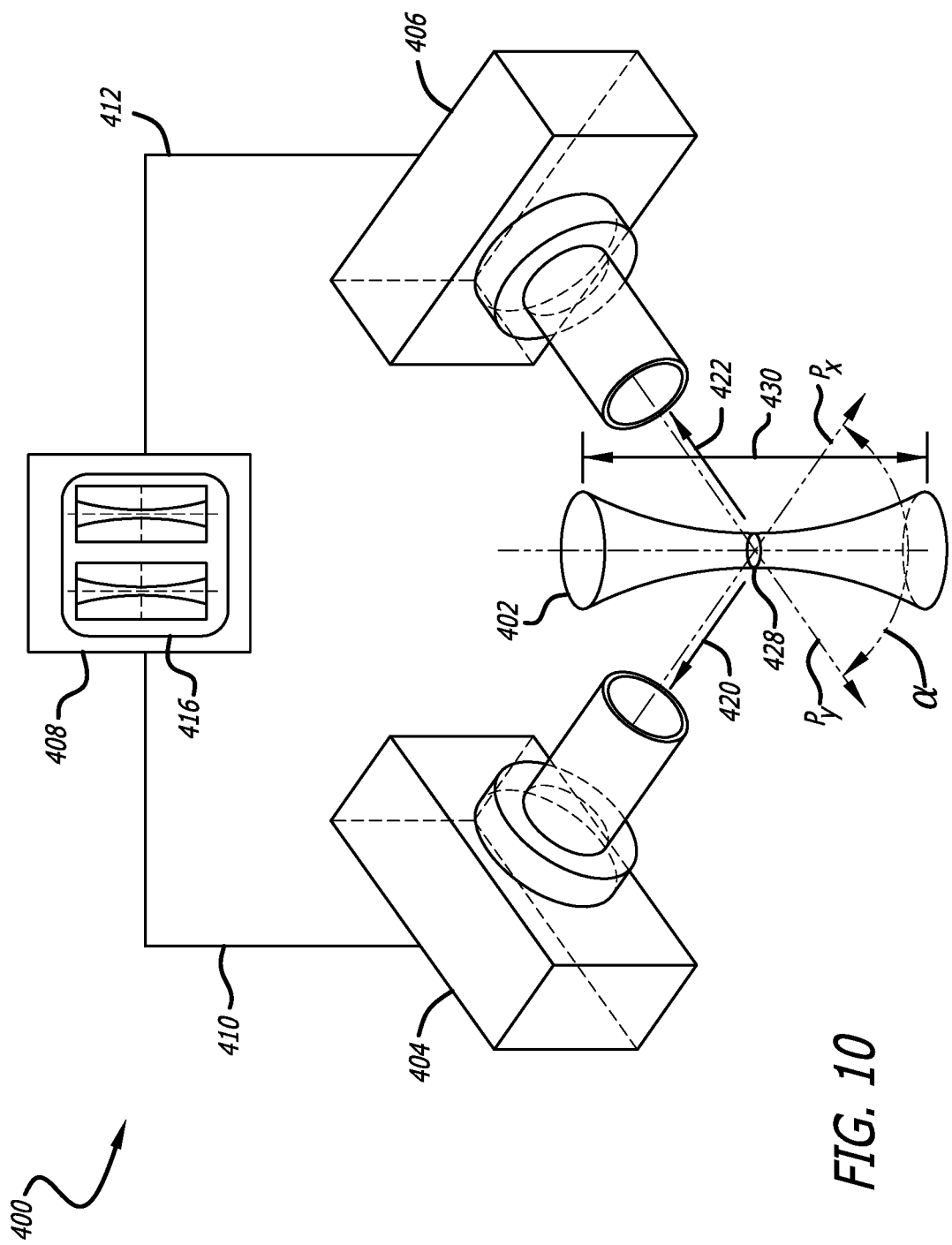
FIG. 10 shows an alternate embodiment of a laser beam quality measurement apparatus using multiple imaging devices for use with the focus correction method.
Figure 11:
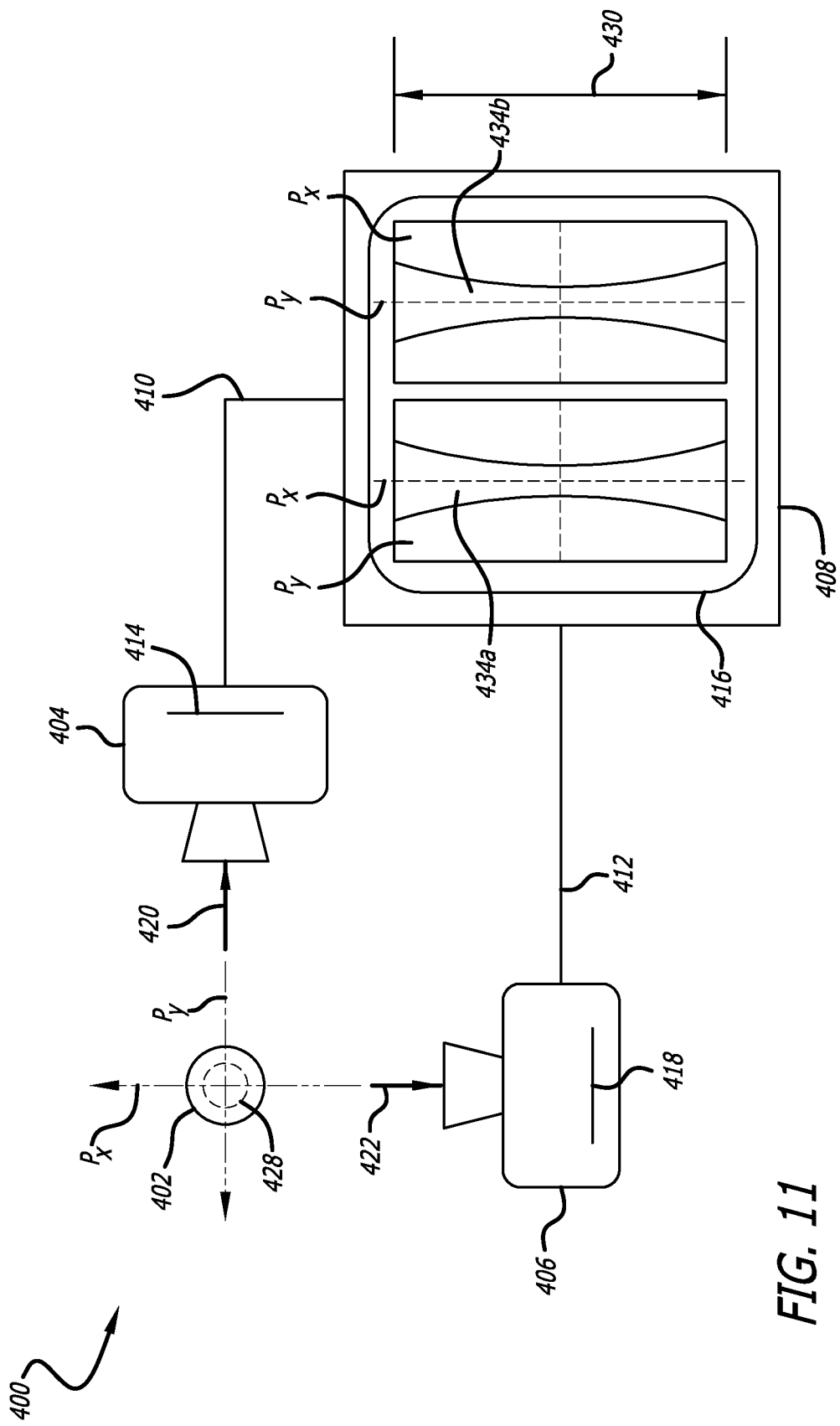
FIG. 11 shows a view of the embodiment of the laser beam quality measurement apparatus shown in FIG. 10 where the laser beam intersects two focal planes.

FIGS. 10-13 show views of an alternate embodiment of a beam quality measurement apparatus 400 configured with multiple imaging devices. As shown in FIGS. 10 and 11, the laser beam quality measurement apparatus 400 may comprise at least two imaging devices 404 and 406 that may be in optical communication with at least one beam 402 propagating through at least one sampling region 430. The imaging devices 404 and 406 may be configured to capture one or more light signals 420 and 422 scattered from the beam 402 and direct them via at least two conduits 410 and 412, respectively, to at least one image processing module 408. Those skilled in the art will appreciate that a single conduit may be used. Exemplary types of conduits 106 include, without limitation, electrical cables (such as USB, FireWire, CAT5), fiber optic cables or digital optical cables. Optionally, the conduit 106 may comprise network or wireless communication protocols such as GigE Ethernet, Bluetooth, WiFi and the like. The imaging processing module 408 may be configured to process the signals 420 and 422 and display one or more beam images 434 on one or more displays 416. The imaging devices 404 and 406 may further comprise at least one image sensor 414 and 418, respectively. In the illustrated embodiment, the imaging devices 404 and 406 are cameras with at least one CMOS image sensors 414, 418 disposed therein. Optionally, the image sensors 414, 418 may comprise charge-coupled device (CCD) image sensors, focal plane arrays, pyroelectric arrays, scanning arrays, time-delay integration imagers and the like. Those skilled in the art will appreciate that a wide variety of imaging sensors, imaging devices or imaging systems may be used with the apparatus 400. As shown in FIG. 10, the imaging devices 404 and 406 are separated by at least one angle $\alpha$. In the illustrated embodiment, angle $\alpha$ may be 90°, making the imaging devices orthogonal to each other in at least one plane. Alternatively, angle $\alpha$ may be anywhere between 1 and 179 degrees. As described above, the image processing module 408 may analyze the images 434 shown in the display 416 to compute various beam parameters.

FIG. 11 shows an alternate view of the embodiment of the laser beam quality measurement apparatus 400 shown in FIG. 10. In the illustrated embodiment, the imaging devices 406 and 404 may define focal planes $P_y$ and $P_x$, respectively, oriented orthogonal to each other, although those skilled in the art will appreciate that focal planes $P_y$ and $P_x$ may not be orthogonal to each other. Optionally, the imaging devices 404 and 406 may define a single focal plane or more than two focal planes that may intersect at a variety of angles. As shown in FIG. 11, the beam 402 is shown end-on, intersecting the focal planes $P_y$ and $P_x$, as though it were entering or exiting the surface of the page. As shown in FIGS. 10 and 11, in the illustrated embodiment, the beam 402 propagates along the intersection of focal planes $P_y$ and $P_x$. The display 416 shows images 434a and 434b relating to the focal planes $P_y$ and $P_x$, respectively, as captured by imaging devices 406 and 404 respectively. Optionally, the display 416 may show a single image or any number of images 434. In the illustrated embodiment, the images 434a and 434b displayed on display device 416 are substantially similar and may be observed to be in focus. In this embodiment, because both images 434a and 434b are in focus, no focus correction is required. The image processing module 408 may use the images 434a and 434b to compute a set of beam parameters such as beam waist size, location or focal shift, Rayleigh range, beam centroid, angular divergence, beam parameter product and the $M^2$ beam propagation ratio, and the like, that the operator may use to characterize and control performance of the laser or light source 10 shown in FIG. 1. Those skilled in the art will appreciate that any number of beam parameters or characteristics of the beam 402 may be computed.

Figure 12:
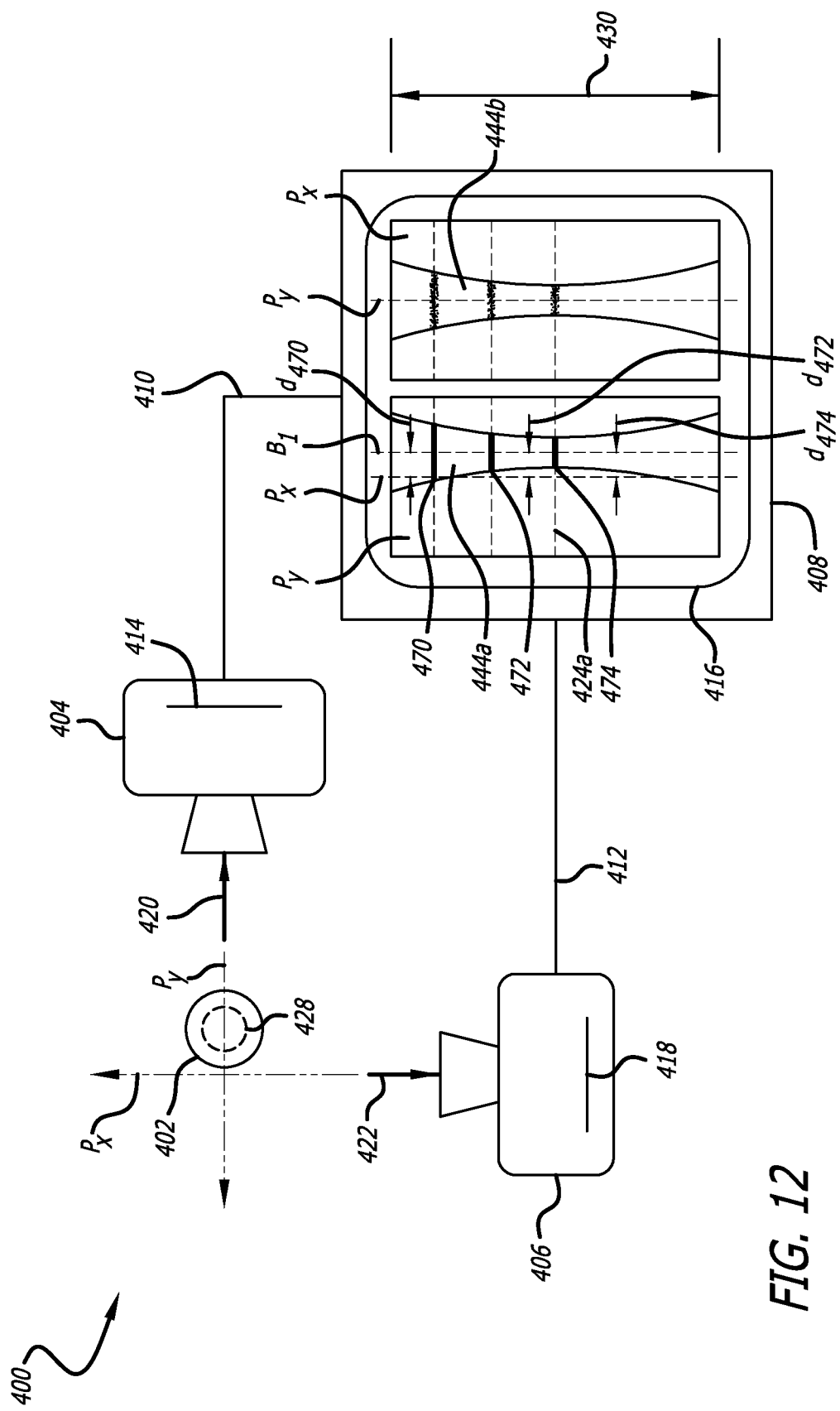
FIG. 12 shows a view of the embodiment of the laser beam quality measurement apparatus shown in FIG. 10 where the laser beam intersects one focal plane.

FIG. 12 shows an alternate view of the embodiment of the laser beam quality measurement apparatus 400 shown in FIG. 10. As shown, the beam 402 may traverse at least one sampling region 430 and may be positioned so that it intersects focal plane $P_y$, but not focal plane $P_x$. If the beam 402 is offset from or is not parallel to one or both focal planes, the beam 402 may be observed as being out of focus over some or all of its extent. In the illustrated embodiment, display 416 shows images 444a and 444b as captured by the imaging devices 406 and 404, respectively, and processed by the image processing module 408. As shown in FIG. 12, because the beam 402 intersects the focal plane $P_y$, the image 444a may be observed to be in focus. In contrast, because the beam 402 does not intersect focal plane $P_x$, the image 444b may be observed to be out of focus. The method of correction of the image 444b may be similar to that applied to image 234b shown above in FIGS. 4, 5A and 5B. In the illustrated embodiment, for example, the image processing module 408 may generate one or more slices 470, 472 and 474 by scanning the image 444a with at least one cursor 424a various positions along the image 444a. Those skilled in the art will appreciate that any number of slices may be generated by the image processing module 408. In the illustrated embodiment, the image processing module 408 may be configured to analyze images 444a and 444b to determine at least one axis $B_1$ and to use that data to compute the distance d from the center of each slice 470-474 to the focal plane $P_x$, whose position is known. The image processing module 408 may also be configured to determine the distance d from the center of each slice 470-474 to the focal plane $P_y$. The values of the distances $d_{470}$, $d_{472}$ and $d_{474}$ from the center of their respective slices to the axis $P_x$ is used to deconvolve each slice using the transfer function corresponding to that distance, and reassemble the deconvolved slices into a corrected image relating to focal plane $P_x$ that can be used to compute the correct beam parameters of the beam 402.

Figure 13:
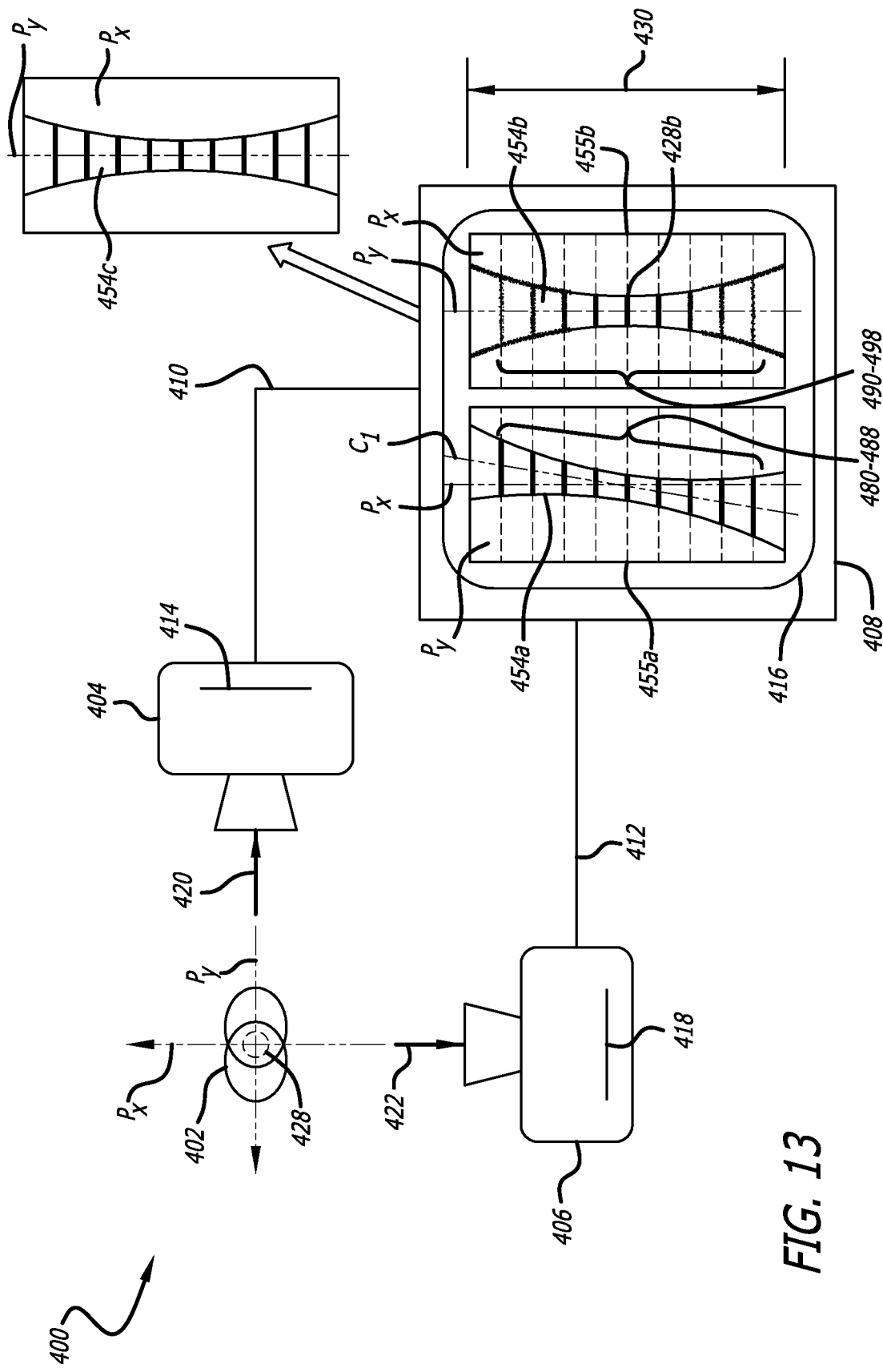
FIG. 13 shows a view of the embodiment of the laser beam quality measurement apparatus shown in FIG. 10 where the laser beam intersects two focal planes at an angle.
Figure 14:
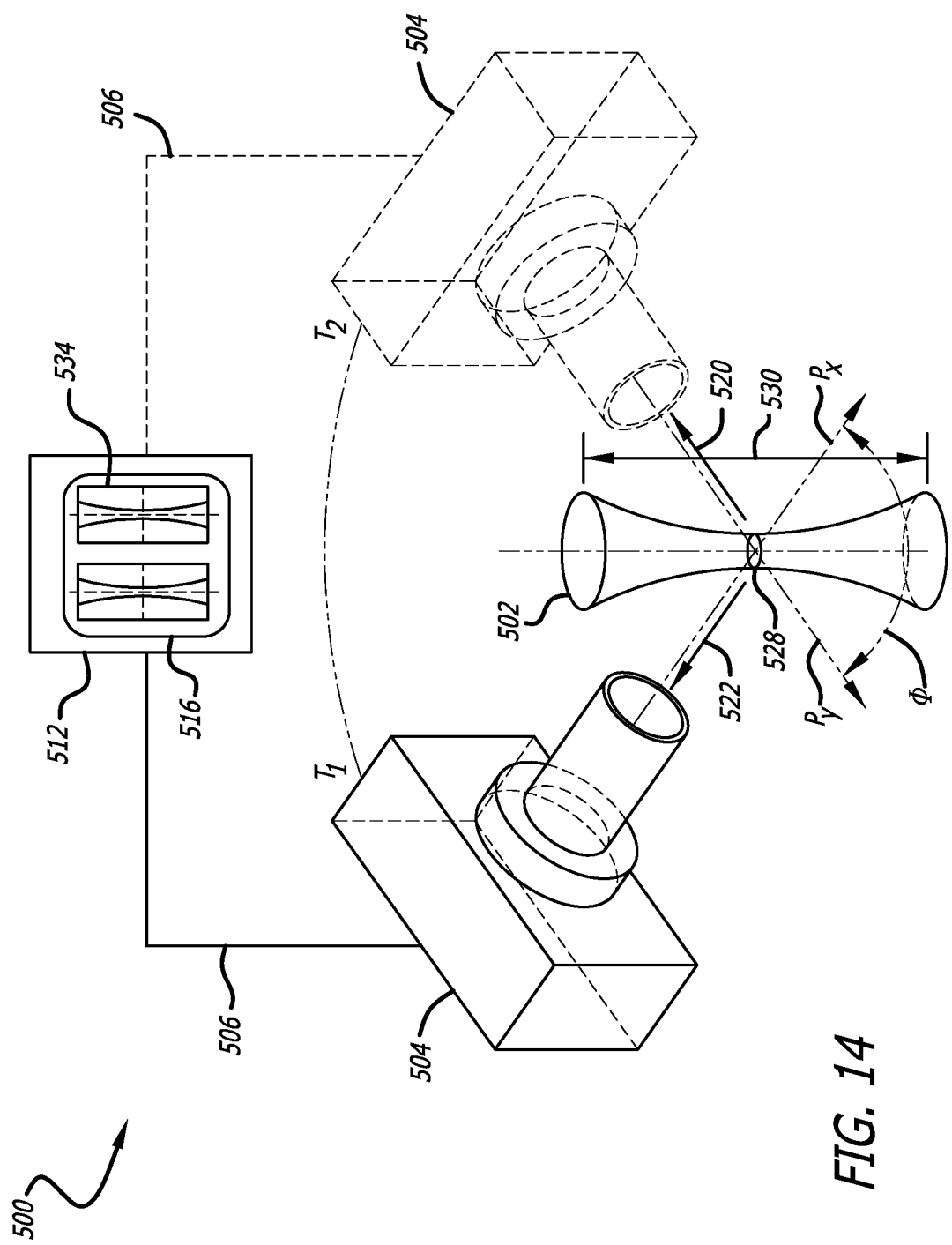
FIG. 14 shows an alternate embodiment of a laser beam quality measurement apparatus for use with the focus correction method using a single imaging device that may be moved between multiple positions allowing multiple images to be acquired at multiple angular focal planes.

FIG. 13 shows an alternate view of the embodiment of the laser beam quality measurement apparatus 400 shown in FIG. 10. As shown, similar to FIG. 6 above, the beam 402 traverses at least one sampling region 430 and is positioned such that it intersects but may not be parallel to at least one of focal planes $P_y$ and $P_x$. In the illustrated embodiment, display 416 shows images 454a (relating to focal plane $P_y$) and 454b (relating to focal plane $P_x$) as captured by the imaging devices 406 and 404, respectively, and processed by the image processing module 408. As shown in the display 416, the image 454a appears slanted at an angle relative to focal plane $P_x$ but otherwise may be observed to be in focus. Image 454b appears to be focused only at the beam waist 428b. The method of correction of the image 454b may be similar to that applied to image 334b shown above in FIGS. 6, 7A-7B, 8A-8B and 9A-9C. In the embodiment shown in FIG. 13, the image processing module 408 may generate slices 480-488 by scanning the image 454a with cursor 455a. The image processing module 408 may analyze the image to define an axis $C_1$. Optionally, the image processing module 408 may analyze any number of images to define any number of optical axes. The image processing module 408 may generate slices 490-498 by scanning the image 454b with cursor 455b. Those skilled in the art will appreciate that the beam 402 may intersect focal planes $P_y$ and $P_x$ at a variety of angles, or the beam 402 may intersect neither focal plane $P_y$ and $P_x$. As described similarly above with respect to FIGS. 6, 7A-7B, 8A-8B and 9A-9C, the image processing module 408 may compute the distances $d_{480}$ through $d_{488}$ from the center of slices 480-488 to the optical axis $C_1$ and use them to deconvolve each slice 490-498 using the in-focus transfer function $H(\xi)$ and the out-of-focus transfer function $G(\xi,d)$ corresponding to each distance, and reassemble the deconvolved slices into an image 454c shown in FIG. 13 that can be used to compute the correct beam parameters such as beam divergence and beam propagation ratio $M^2$ as described above. Those skilled in the art will appreciate that the out of focus blur may be corrected by applying a variety of optical or signal processing methods to the images the beam 402.

FIG. 14 shows an embodiment of a beam quality measurement apparatus 500 where a single imaging device 504 may be configured to be repositionable from a first position $T_1$ to a second position $T_2$, thereby allowing multiple images to be acquired at multiple angular focal planes. As shown, the imaging device 504 may be in optical communication with and configured to receive one or more scattered light signals 520 and 522 from at least one beam 502 propagating through at least one sampling region 530. As shown, the imaging device 504 may be repositioned from position $T_1$ to position $T_2$ to collect one or more scattered light signals 520 and 522. The imaging device 504 may be configured to direct the images of scattered light signals 520 and 522 via at least one conduit 506 to at least one image processing module 512 that may be configured to process the signals and display one or more images on one or more displays 516. As described in various embodiments above, the image processing module 512 may analyze the images shown in the display 516 to compute various beam parameters. As described above, the focus correction methods described above may be used to correct for out-of-focus images for the beam 502 due to misalignment of the beam relative to focal planes $P_y$ and $P_x$.

While a method and apparatus for focus correction of a beam image of a laser measurement system is disclosed by reference to the various embodiments and examples detailed above, it should be understood that these examples are intended in an illustrative rather than limiting sense, as it is contemplated that modifications will readily occur to those skilled in the art which are intended to fall within the scope of the present invention.

What is claimed is:

1. A method for correcting the focus of an image, comprising:
    providing at least one imaging device defining at least one first focal plane $P_y$, and at least one second focal plane $P_x$, wherein the at least one imaging device includes at least one image sensor configured to capture one or more images of one or more scattered light signals scattered through Rayleigh scattering from at least one laser beam propagating through at least one sampling region, wherein the at least one imaging device includes at least one in-focus modulation transfer function $H(\xi)$;
    providing at least one image processing module having at least one display, wherein the at least one image processing module is in communication with the at least one imaging device;
    with the at least one image sensor of the at least one imaging device:
        capturing at least one in-focus image in the first focal plane $P_y$ of a first scattered light signal; and
        capturing at least one out-of-focus image in the second focal plane $P_x$ of a second scattered light signal;
    with the at least one image processing module in communication with the at least one imaging device:
        generating one or more slices of the at least one in-focus image by scanning the at least one in-focus image with at least one cursor at one or more cursor positions;
        determining at least one first axis $B_1$ of the at least one in-focus image in the at least one first focal plane $P_y$;
        computing a computed distance, d, from a center of each of the one or more slices to the second focal plane $P_x$, and assigning values of the computed distances from each respective slice, wherein the center of each of the one or more slices is defined relative to the at least one in-focus image;

determining at least one out-of-focus transfer function $G(\xi,d)$ for each of the one or more slices using the assigned values of the computed distances;

deconvolving each slice of the in-focus image against the in-focus modulation transfer function $H(\xi)$ and the out-of-focus transfer function $G(\xi,d)$;

outputting at least one corrected image to the at least one display of the at least one image processing module; and using the at least one corrected image to calculate a width of at least one beam waist shown in the at least one corrected image.

2. The method of claim 1 wherein at least one of the one or more scattered light signals is scattered through Raman scattering of the at least one laser beam.

3. The method of claim 1, further comprising using the at least one corrected image to calculate a location of the at least one beam waist along the at least one first axis of the at least one laser beam.

4. The method of claim 1, further comprising using the at least one corrected image to calculate a Rayleigh range of the at least one laser beam.

5. The method of claim 1, further comprising using the at least one corrected image to calculate a beam parameter product for the at least one laser beam.

6. The method of claim 1, further comprising using the at least one corrected image to find a beam divergence along the at least one first axis of the at least one laser beam.

* * * * *